(12) United States Patent
Chun et al.

(10) Patent No.: US 8,547,895 B2
(45) Date of Patent: Oct. 1, 2013

(54) METHOD AND APPARATUS FOR TRANSMITTING AND RECEIVING SIGNAL IN RELAY STATION

(75) Inventors: Jin Young Chun, Anyang-si (KR); Dong Guk Lim, Anyang-si (KR); Han Gyu Cho, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 12/886,726

(22) Filed: Sep. 21, 2010

(65) Prior Publication Data

US 2011/0070821 A1 Mar. 24, 2011

Related U.S. Application Data

(60) Provisional application No. 61/244,348, filed on Sep. 21, 2009, provisional application No. 61/244,775, filed on Sep. 22, 2009.

(30) Foreign Application Priority Data

Apr. 5, 2010 (KR) .................. 10-2010-0031025

(51) Int. Cl.
*H04B 7/14* (2006.01)
*H04W 4/00* (2009.01)
*H04J 3/06* (2006.01)

(52) U.S. Cl.
USPC ............................ 370/315; 370/328; 370/350

(58) Field of Classification Search
None
See application file for complete search history.

(56) References Cited

U.S. PATENT DOCUMENTS

| | | | |
|---|---|---|---|
| 2009/0075588 A1* | 3/2009 | Zhu et al. ................... 455/18 |
| 2010/0054172 A1* | 3/2010 | Boariu et al. .............. 370/315 |
| 2010/0226305 A1* | 9/2010 | Jang ........................... 370/315 |
| 2010/0278123 A1* | 11/2010 | Fong et al. ................. 370/329 |
| 2011/0069743 A1* | 3/2011 | Chang et al. ............... 375/211 |

OTHER PUBLICATIONS

Shkumbin, H., IEEE 802.16 Broadband Wireless Access Working Group, "The Draft IEEE 802.16m System Description Document," Jun. 16, 2008, pp. 1-55.
Sydir, J., et al., IEEE Communications Magazine, "An Evolved Cellular System Architecture Incorporating Relay Stations," Jun. 2009, pp. 115-121.
IEEE Standard for Local and Metroplitan Area Networks, "Part 16: Air Interface for Broadband Wireless Access Systems, Amendment 1: Multihop Relay Specification," Jun. 12, 2009, pp. 1-290.

* cited by examiner

*Primary Examiner* — Jutai Kao
(74) *Attorney, Agent, or Firm* — Morgan, Lewis & Bockius LLP

(57) ABSTRACT

A method of a Relay Station (RS) transmitting and receiving a signal in a wireless communication system including the RS, comprising receiving frame configuration information about an RS frame from a Base Station (BS), configuring a downlink (DL) access zone in which a signal is transmitted to a relay Mobile Station (MS) connected to the RS and a DL relay zone in which a signal is received from the BS in the RS frame on the basis of the frame configuration information, comparing a time necessary to switch an operation from the DL access zone to the DL relay zone and a propagation delay time taken to receive the signal from the BS, configuring some symbols of the DL access zone or the DL relay zone as a transition time according to a result of the comparison, transmitting the signal to the relay MS in the DL access zone, and receiving the signal from the BS in the DL relay zone.

6 Claims, 13 Drawing Sheets

METHOD AND APPARATUS FOR TRANSMITTING AND RECEIVING SIGNAL IN RELAY STATION

CROSS-REFERENCE TO RELATED APPLICATIONS

This application claims the benefit of priority of U.S. Provisional application 61/244,348 filed on Sep. 21, 2009, U.S. Provisional application 61/244,775 filed on Sep. 22, 2009, and Korean Patent Application No. 10-2010-0031025 filed on Apr. 5, 2010, all of which are incorporated by reference in their entirety herein.

BACKGROUND OF THE INVENTION

1. Field of the Invention

The present invention relates to wireless communication and, more particularly, to a method of a relay station transmitting and receiving a signal and an apparatus for performing the same.

2. Related Art

An IEEE (Institute of Electrical and Electronics Engineers) 802.16e standard is a sixth standard for IMT (International Mobile Telecommunication)-2000 in the ITU-R (ITU-Radio communication Sector) under the control of ITU (International Telecommunication Union) in the year 2007 and has been adopted by the name of 'WMAN-OFDMA TDD'. The ITU-R is preparing for an IMT-Advanced system which is the next-generation 4G mobile communication standard since the IMT-2000. IEEE 802.16 WG (Working Group) has decided to go ahead with an IEEE 802.16m project with the object of writing an amendment standard of the existing IEEE 802.16e which is a standard for the IMT-Advanced system at the end of the year 2006. As can be seen from the above object, the IEEE 802.16m standard involves the two aspects of the past continuation (i.e., an amendment of the IEEE 802.16e standard) and the future continuation (i.e., a standard for the next-generation IMT-Advanced system). Accordingly, the IEEE 802.16m standard is required to fulfill all advanced requirements for the IMT-Advanced system while maintaining compatibility with a Mobile WiMAX system based on the IEEE 802.16e standard.

In the case of a wideband wireless communication system, an effective transmission and reception scheme and a utilization scheme have been proposed in order to maximize the efficiency of limited radio resources. One of the systems taken into consideration in the next-generation wireless communication system is an Orthogonal Frequency Division Multiplexing (OFDM) system which can attenuate an Inter-Symbol Interference (ISI) effect with low complexity. The OFDM system converts serially inputted data symbols into N number of parallel data symbols and carries them on N number of separated subcarriers. The subcarriers maintain orthogonality in the frequency domain. Each of the orthogonal channels experiences independent frequency selective fading. Accordingly, complexity at a receiving terminal can be reduced, the interval between transmitted symbols is lengthened, and ISI can be minimized.

Orthogonal Frequency Division Multiple Access (OFDMA) refers to a multi-access method for realizing multi-access by independently providing some of available subcarriers to respective users in a system using OFDM as a modulation method. In the OFDMA method, it is common that frequency resources called the subcarriers are provided to respective users, and the frequency resources do not overlap with each other because they are independently provided to the plurality of users. Consequently, the frequency resources are exclusively allocated to the users. In the OFDMA system, frequency diversity for multiple users can be obtained through frequency selective scheduling, and subcarriers can be allocated in various ways according to a permutation method for the subcarriers. Further, the efficiency of a spatial region can be increased through a spatial multiplexing scheme using multiple antennas.

Meanwhile, a wireless communication system including relay stations is being developed. The relay station (RS) functions to expand the cell coverage and improve the performance of transmission. If a base station provides services to a mobile station, placed at the boundary of the coverage of the base station, through a relay station, the cell coverage can be expanded. Furthermore, if a relay station improves reliability in the transmission of signals between a base station and a mobile station, the amount of transmission data can be increased. Although a mobile station is placed within the cell coverage of a base station, it may use a relay station if the mobile station is placed in the shadow region.

The relay station can be chiefly divided into two types. The first type is a transparent relay station. In this type, a base station determines all pieces of information necessary for a relay process, and the transparent relay station simply relays data, received from the base station, to a subordinate relay station or a mobile station. The transparent relay station uses the same carrier frequency as a superordinate or subordinate station. The second type is a non-transparent relay station. The non-transparent relay station directly performs resource allocation necessary for a relay process, the determination of a Modulation and Coding Scheme (MCS) level, power control, etc. and relays data. The non-transparent relay station may use the same carrier frequency as a superordinate or subordinate station or may use a different carrier frequency from the superordinate or subordinate station.

In a centralized scheduling mode, a base station determines the allocation of frequency bands for a relay station (RS) and a relay station mobile station (RS-MS). In a distributed scheduling mode, a RS determines the allocation of frequency bands to a RS-MS while operating in conjunction with a base station. A transparent base station can be operated only in the centralized scheduling mode, and a non-transparent base station can be operated in the centralized or distributed scheduling mode.

Amplify and Forward (AF) and Decode and Forward (DF) can be used as a relay method for a RS. In the AF method, the RS amplifies data received from a base station and transmits the data to a mobile station (MS). In the DF method, the RS checks a destination station by decoding data received from a base station, encodes the decoded data, and relays the encoded data to a subordinate RS or a MS (i.e., the destination station).

In a wireless communication system including such a relay station, a new frame structure different from a conventional frame structure is required. The RS can use the same frequency band, used to transmit a signal to a base station, as a frequency band used to receive a signal from a RS-MS. Alternatively, the RS can use the same frequency band, used to receive a signal from a base station, as a frequency band used to transmit a signal to a RS-MS. The RS is difficult to transmit and receive a signal at the same time in the same frequency band because of self-interference. Accordingly, the time for switching the operation mode between the transmission and reception of a signal is required. It is assumed that in the operation mode transition time, a RS is in general unable to transmit or receive a signal.

There is a propagation delay time that must be taken into consideration along with the operation mode transition time. The propagation delay time can be considered as a physical transfer time which is taken to transmit and receive a radio signal between two communication stations. In other words, in a wireless communication system including a relay station, the RS has to communicate with a base station and a MS on the basis of a timing relationship in which the operation mode transition time, the propagation delay time, and so on are taken into consideration.

SUMMARY OF THE INVENTION

The present invention provides a method of a relay station transmitting and receiving a signal in a wireless communication system including the relay station and an apparatus for performing the same.

In accordance with an aspect of the present invention, there is provided a method of a Relay Station (RS) transmitting and receiving a signal in a wireless communication system including the RS, comprising receiving frame configuration information about an RS frame from a Base Station (BS), configuring a downlink (DL) access zone in which a signal is transmitted to a relay Mobile Station (MS) connected to the RS and a DL relay zone in which a signal is received from the BS in the RS frame on the basis of the frame configuration information, comparing a time necessary to switch an operation from the DL access zone to the DL relay zone and a propagation delay time taken to receive the signal from the BS, configuring some symbols of the DL access zone or the DL relay zone as a transition time according to a result of the comparison, transmitting the signal to the relay MS in the DL access zone, and receiving the signal from the BS in the DL relay zone.

In accordance with another aspect of the present invention, there is provided a method of an RS transmitting and receiving a signal in a wireless communication system including the RS, comprising receiving frame configuration information about an RS frame from a BS, configuring an uplink (UL) access zone in which a signal is received from a relay MS connected to the RS and an UL relay zone in which a signal is transmitted to the BS in the RS frame on the basis of the frame configuration information, receiving the signal from the relay MS in the UL access zone, and transmitting the signal to the BS in the UL relay zone. The UL access zone is time-aligned with an UL access zone of a BS frame and then transmitted or transmitted before the UL access zone of the BS frame as much as a specific time interval.

In accordance with yet another aspect of the present invention, there is provided a method of an RS transmitting and receiving a signal in a wireless communication system including the RS, comprising receiving frame configuration information about an RS frame from a BS, configuring a frame, comprising a DL access zone in which a signal is transmitted to a relay MS connected to the RS, a DL relay zone in which a signal is received from the BS, an UL access zone in which a signal is received from the relay MS connected to the RS, and an UL relay zone in which a signal is transmitted to the BS, on the basis of the frame configuration information, configuring a transition time in the DL access zone or the UL relay zone, transmitting the signal in the DL access zone or the UL relay zone and receiving the signal in the DL relay zone or the UL access zone.

An RS can perform communication with a BS or a relay MS by taking an operation switching time between a reception mode and a transmission mode and a transmission delay time required to transmit and receive a signal into consideration. Accordingly, communication can be performed with an RS included in a wireless communication system even without greatly changing a frame structure between the existing BS and the existing macro MS.

DESCRIPTION OF EXEMPLARY EMBODIMENTS

The following technologies can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single-Carrier Frequency Division Multiple Access (SC-FDMA). The CDMA system can be implemented using radio technology, such as Universal Terrestrial Radio Access (UTRA) or CDMA2000. The TDMA system can be implemented using radio technology, such as Global System for Mobile communications (GSM), General Packet Radio Service (GPRS), or Enhanced Data Rates for GSM Evolution (EDGE). The OFDMA system can be implemented using radio technology, such as IEEE (Institute of Electrical and Electronics Engineers) 802.11 (Wi-Fi), IEEE 802.16 (WiMAX), IEEE 802-20, or Evolved UTRA (E-UTRA). The IEEE 802.16m is the evolution of IEEE 802.16e, and it provides backward compatibility with an IEEE 802.16e-based system. The UTRA is part of a Universal Mobile Telecommunications System (UMTS). $3^{rd}$ Generation Partnership Project (3GPP) Long Term Evolution (LTE) is part of Evolved UTMS (E-UMTS) using Evolved-UMTS Terrestrial Radio Access (E-UTRA). The 3GPP LTE adopts OFDMA in the downlink and SC-FDMA in the uplink. LTE-A (Advanced) is the evolution of 3GPP LTE.

In order to clarify a description, an IEEE 802.16m system is chiefly described, but the technical feature of the present invention is not limited thereto.

Figure 1:
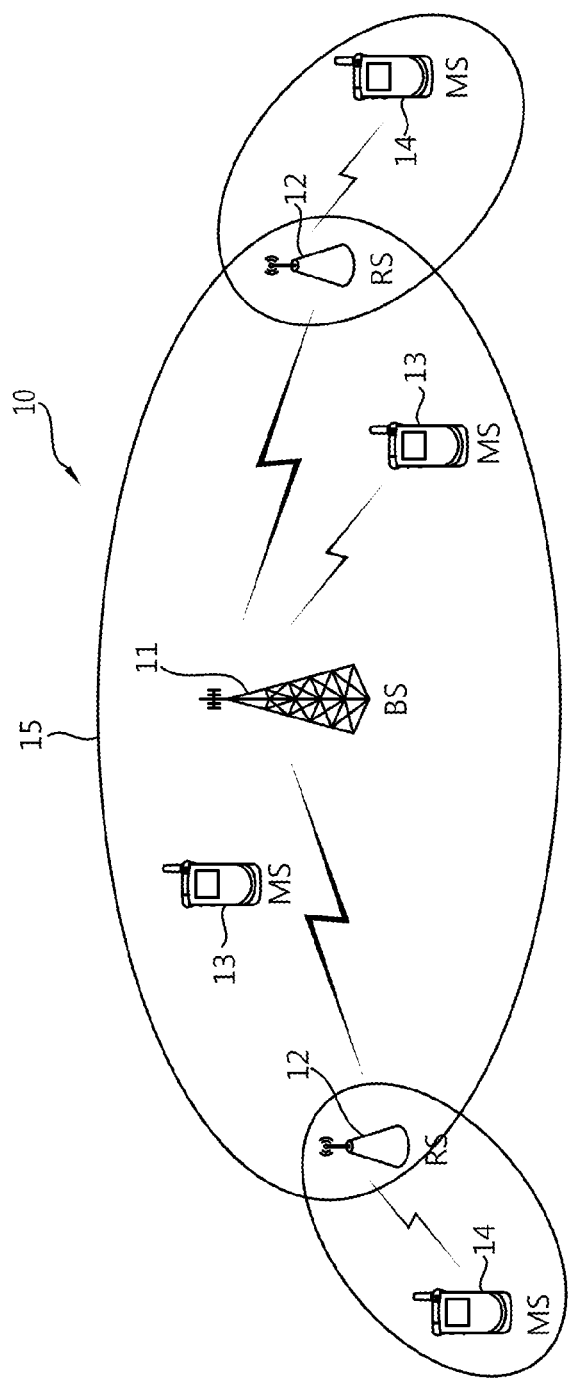
FIG. 1 is a diagram showing a wireless communication system including relay stations.

FIG. 1 is a diagram showing a wireless communication system including Relay Station (hereinafter referred to as RS).

Referring to FIG. 1, the wireless communication system 10 including RSs includes at least one Base Station (hereinafter referred to as a BS). The BS 11 provides communication services to a geographical area 15, in general called a cell. The cell can be divided into a plurality of areas. Each of the areas is called a sector. One or more cells can exist in one BS. In general, the BS 11 refers to a fixed station which communicates with a Mobile Station (hereinafter referred to as an MS) 13, and it can also be referred to as another terminology, such as an Evolved NodeB (eNB), a Base Transceiver System (BTS), an Access Point (AP), an Access Network (AN), or an Advanced Base Station (ABS). The BS 11 can perform functions, such as connectivity, management, control, and resource allocation between an RS 12 and an MS 14.

The RS 12 refers to a device for relaying signals between the BS 11 and the MS 14, and it can also be referred to as another terminology, such as a Relay Node (RN), a repeater, or an Advanced Relay Station (ARS). Any method, including Amplify and Forward (AF) and Decode and Forward (DF), can be used as the relay method used by the RS, but the technical feature of the present invention is not limited thereto.

The MSs 13 and 14 can be fixed and mobile and can also be referred to as another terminology, such as an Advanced Mobile Station (AMS), a User Terminal (UT), a Subscriber Station (SS), a wireless device, a Personal Digital Assistant (PDA), a wireless modem, a handheld device, an Access Terminal (AT), or a User Equipment (UE). Hereinafter, a macro MS refers to an MS directly communicating with the BS 11, and a relay MS(RS-MS) refers to an MS communicating with an RS. The macro MS 13 within the cell of the BS 11 can also communicate with the BS 11 via the RS 12 in order to improve the transfer rate according to the diversity effect.

It is hereinafter assumed that downlink (DL) refers to communication from the BS 11 to the macro MS 13 and uplink (UL) refers to communication from the macro MS 13 to the BS 11.

Figure 2:
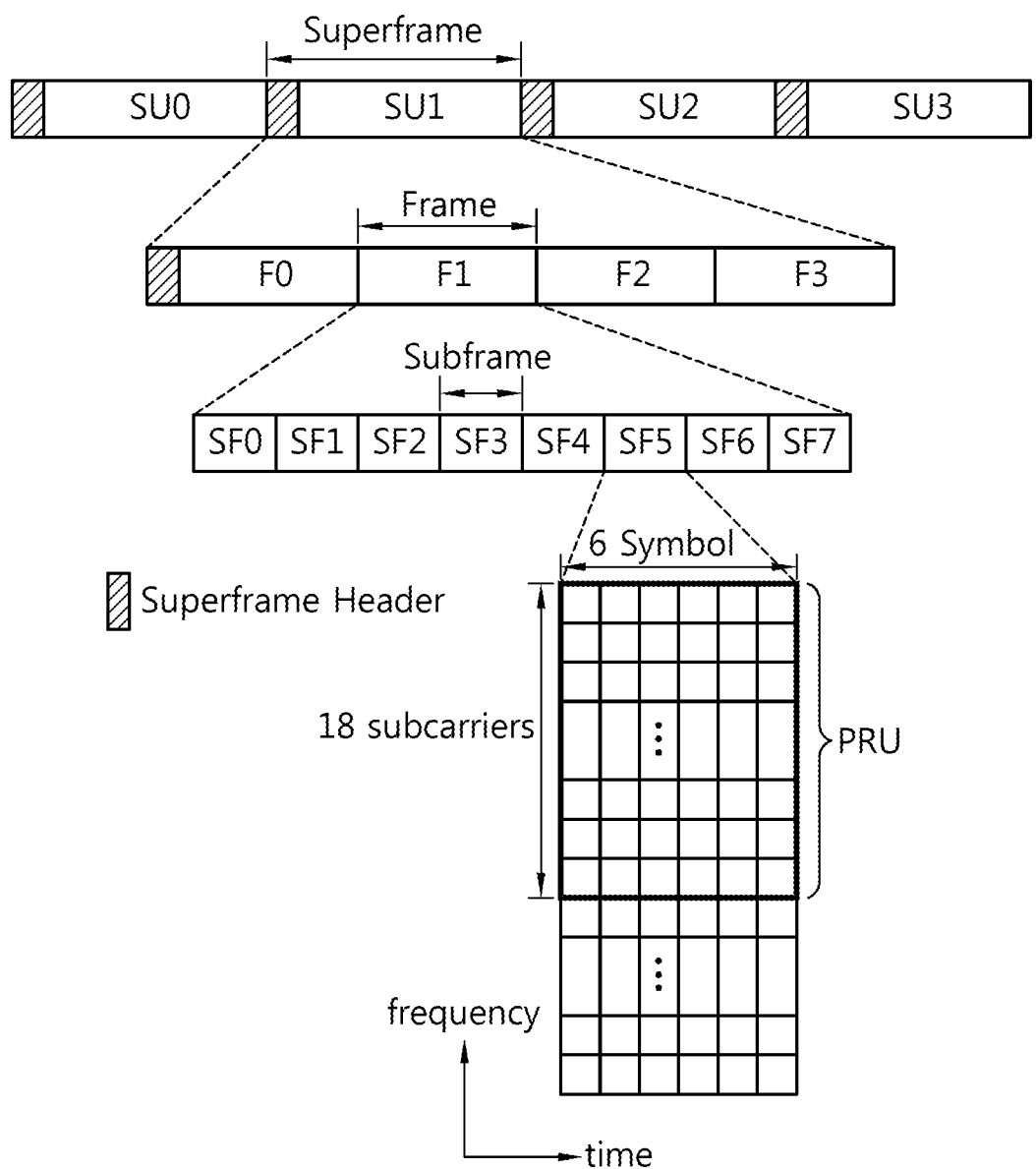
FIG. 2 is a diagram showing an example of a superframe structure.

FIG. 2 is a diagram showing an example of a superframe structure.

A superframe (SF) includes a superframe header (SFH) and 4 frames F0, F1, F2, and F3. The frames within the superframe can have the same length. The size of each superframe can be 20 ms and the size of each frame can be 5 ms, but not limited thereto. The length of the superframe, the number of frames included in the superframe, the number of subframes included in each frame, etc. can be modified in various ways. The number of subframes in the frame can be changed in various ways according to a channel bandwidth, the length of a Cyclic Prefix (CP), or both.

The superframe header can carry essential system parameters and system configuration information. The superframe header can be placed within the first subframe of the superframe. The superframe header can be classified into a Primary-SFH (P-SFH) and a secondary-SFH (S-SFH). The P-SFH and the S-SFH can be transmitted every superframe.

One frame includes a plurality of subframes SF0, SF1, SF2, SF3, SF4, SF5, SF6, and SF7. Each of the subframes can be used for UL or DL transmission. One subframe includes a plurality of OFDM (orthogonal frequency division multiplexing) symbols in the time domain and a plurality of subcarriers in the frequency domain. The OFDM symbol is used to represent one symbol period and can be called another terminology, such as an OFDMA symbol or an SC-FDMA symbol, according to a multi-access method. The subframe can be composed of 5, 6, 7, or 9 OFDM symbols, but is only illustrative. The number of OFDM symbols included in the subframe is not limited. The number of OFDM symbols included in the subframe can be changed in various ways according to a channel bandwidth or the length of a CP or both. The type of a subframe can be defined according to the number of OFDM symbols included in the subframe. For example, it can be defined that a type-1 subframe includes 6 OFDM symbols, a type-2 subframe includes 7 OFDM symbols, a type-3 subframe includes 5 OFDM symbols, and a type-4 subframe includes 9 OFDM symbols. One frame can include subframes having the same type. In an alternative example, one frame can include subframes having different types. That is, the number of OFDM symbols included in each of subframes within one frame can be the same or different. In an alternative example, the number of OFDM symbols included in at least one of subframes within one frame can be different from the number of OFDM symbols included in the remaining subframes.

A Time Division Duplex (TDD) method or a Frequency Division Duplex (FDD) method can be applied to a frame. In the TDD method, subframes are used for UL transmission or DL transmission at different times in the same frequency. That is, subframes within the TDD frame of the TDD method are classified into UL subframes and DL subframes in the time domain. Subframes within the FDD frame of the FDD method are used for UL transmission or DL transmission at different frequencies on the same time. That is, subframes within the FDD frame are classified into UL subframes and DL subframes in the frequency domain. UL transmission and DL transmission occupy different frequency bands, and they can be performed at the same time.

One OFDM symbol includes a plurality of subcarriers in the frequency domain, and the number of subcarriers is determined according to the size of an FFT. There are several types of the subcarriers. The types of the subcarriers can be classified into a data subcarrier for data transmission, a pilot subcarrier for a various estimation, a null carrier for a guard band and a DC carrier. Parameters characterizing the OFDM symbol include a BW, $N_{used}$, n, G, and so on. BW is a nominal channel bandwidth. $N_{used}$ is the number of used subcarriers (including DC subcarriers). 'n' is a sampling factor. The parameter is combined with BW and $N_{used}$ and used to determine subcarrier spacing and a useful symbol time. G is the ratio of a CP time and a useful time.

The following Table 1 shows OFDMA parameters.

TABLE 1

| | | | | | | |
|---|---|---|---|---|---|---|
| Channel bandwidth, BW (MHz) | | 5 | 7 | 8.75 | 10 | 20 |
| Sampling factor, n | | 28/25 | 8/7 | 8/7 | 28/25 | 28/25 |
| Sampling frequency, $F_s$ (MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$ (kHz) | | 10.94 | 7.81 | 9.77 | 10.94 | 10.94 |
| Useful symbol time, $T_b$ (μs) | | 91.4 | 128 | 102.4 | 91.4 | 91.4 |
| G = ⅛ | Symbol time, $T_s$ (μs) | 102.857 | 144 | 115.2 | 102.857 | 102.857 |
| | FDD Number of | 48 | 34 | 43 | 48 | 48 |

TABLE 1-continued

|  |  |  |  |  |  |  |  |
|---|---|---|---|---|---|---|---|
|  |  | OFDMA symbols per 5 ms frame |  |  |  |  |  |
|  |  | Idle time (μs) | 62.857 | 104 | 46.40 | 62.857 | 62.857 |
|  | TDD | Number of OFDMA symbols per 5 ms frame | 47 | 33 | 42 | 47 | 47 |
|  |  | TTG + RTG (μs) | 165.714 | 248 | 161.6 | 165.714 | 165.714 |
| G = 1/16 | Symbol time, $T_s$ (μs) |  | 97.143 | 136 | 108.8 | 97.143 | 97.143 |
|  | FDD | Number of OFDMA symbols per 5 ms frame | 51 | 36 | 45 | 51 | 51 |
|  |  | Idle time (μs) | 45.71 | 104 | 104 | 45.71 | 45.71 |
|  | TDD | Number of OFDMA symbols per 5 ms frame | 50 | 35 | 44 | 50 | 50 |
|  |  | TTG + RTG (μs) | 142.853 | 240 | 212.8 | 142.853 | 142.853 |
| G = 1/4 | Symbol time, $T_s$ (μs) |  | 114.286 | 160 | 128 | 114.286 | 114.286 |
|  | FDD | Number of OFDMA symbols per 5 ms frame | 43 | 31 | 39 | 43 | 43 |
|  |  | Idle time (μs) | 85.694 | 40 | 8 | 85.694 | 85.694 |
|  | TDD | Number of OFDMA symbols per 5 ms frame | 42 | 30 | 38 | 42 | 42 |
|  |  | TTG + RTG (μs) | 199.98 | 200 | 136 | 199.98 | 199.98 |
| Number of Guard subcarriers | Left |  | 40 | 80 | 80 | 80 | 160 |
|  | Right |  | 39 | 79 | 79 | 79 | 159 |
| Number of used subcarriers |  |  | 433 | 865 | 865 | 865 | 1729 |
| Number of PRU in type-1 subframe |  |  | 24 | 48 | 48 | 48 | 96 |

In Table 1, $N_{FFT}$ is the smallest power of two greater than $N_{used}$, $F_s$=floor (n·BW/8000)×8000, the subcarrier spacing $\Delta f=F_s/N_{FFT}$, the useful symbol time $T_b=1/\Delta f$, the CP time $T_g=G·T_b$, the OFDMA symbol time $T_s=T_b+T_g$, and the sampling time is $T_b/N_{FFT}$.

Figure 3:
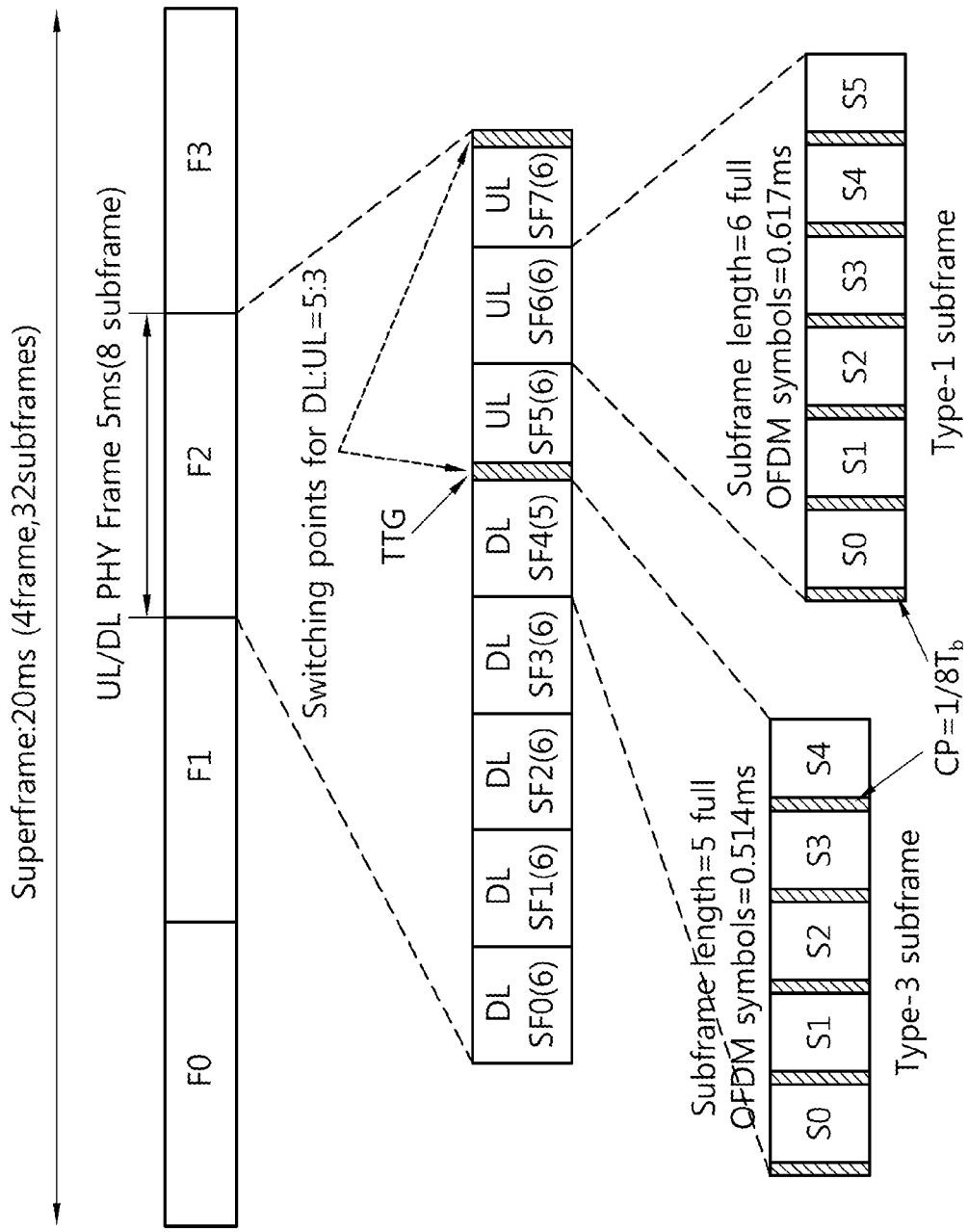
FIG. 3 is a diagram showing an example of a TDD frame structure.

FIG. 3 is a diagram showing an example of a TDD frame structure. This drawing shows a case in which G is 1/8. A superframe of 20 ms in length consists of 4 frames F0, F1, F2, and F3, each having a length of 5 ms. One frame consists of 8 subframes SF0, SF1, SF2, SF3, SF4, SF5, SF6, and SF7, and the ratio of DL subframes to UL subframes is 5:3. The TDD frame structure of FIG. 3 can be applied to a case in which the bandwidth is 5 MHz, 10 MHz, or 20 MHz. The subframe SF4 (i.e., the last DL subframe) includes 5 OFDM symbols, and each of the remaining subframes includes 6 OFDM symbols.

Figure 4:
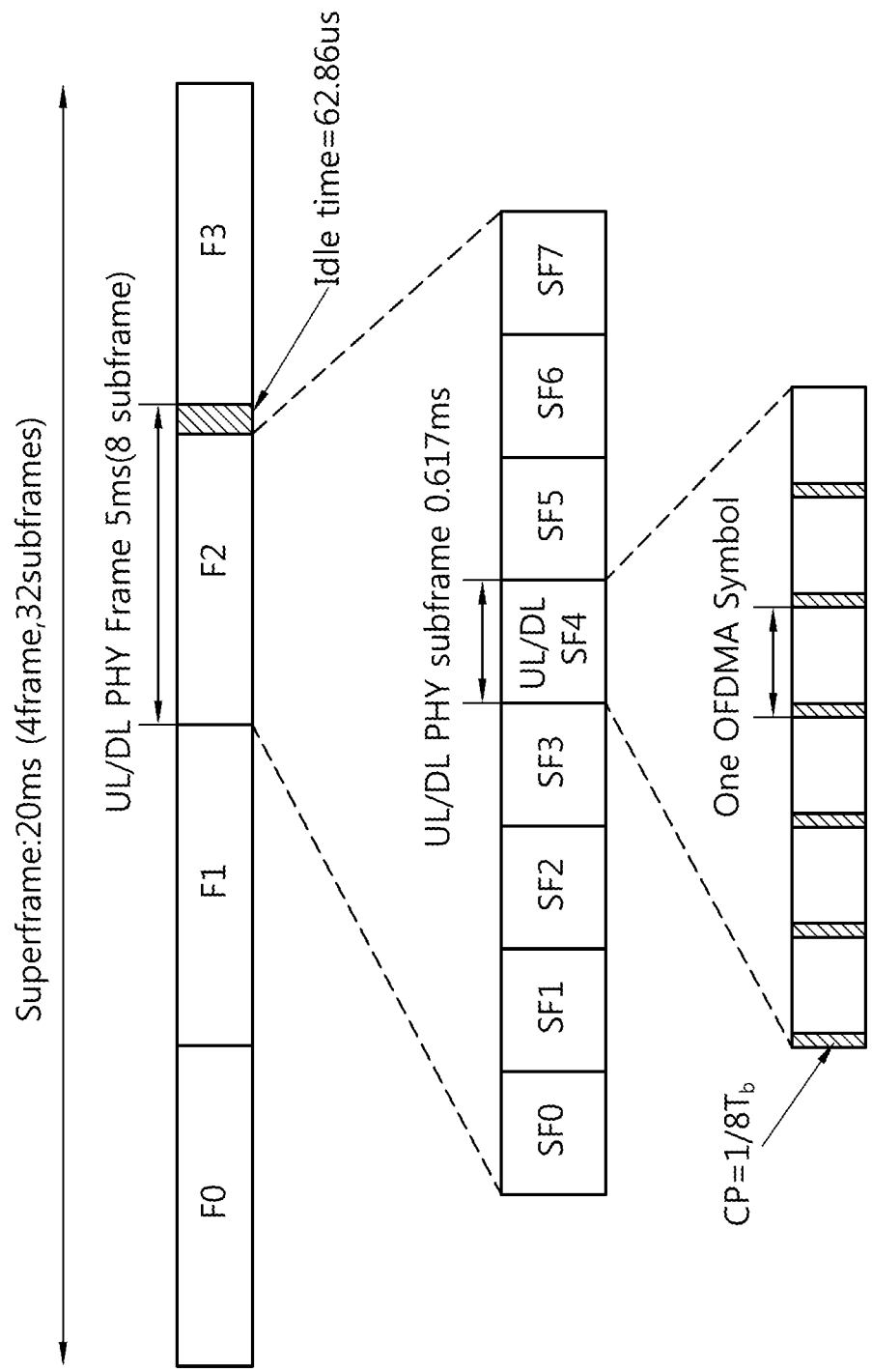
FIG. 4 is a diagram showing an example of an FDD frame structure.

FIG. 4 is a diagram showing an example of an FDD frame structure. This drawings shows a case in which G is 1/8. A superframe of 20 ms in length consists of 4 frames F0, F1, F2, and F3 each having a length of 5 ms. One frame consists of 8 subframes SF0, SF1, SF2, SF3, SF4, SF5, SF6, and SF7. All the subframes include a DL region and an UL region. The FDD frame structure of FIG. 4 can be applied to a case in which the bandwidth is 5 MHz, 10 MHz, or 20 MHz.

Figure 5:
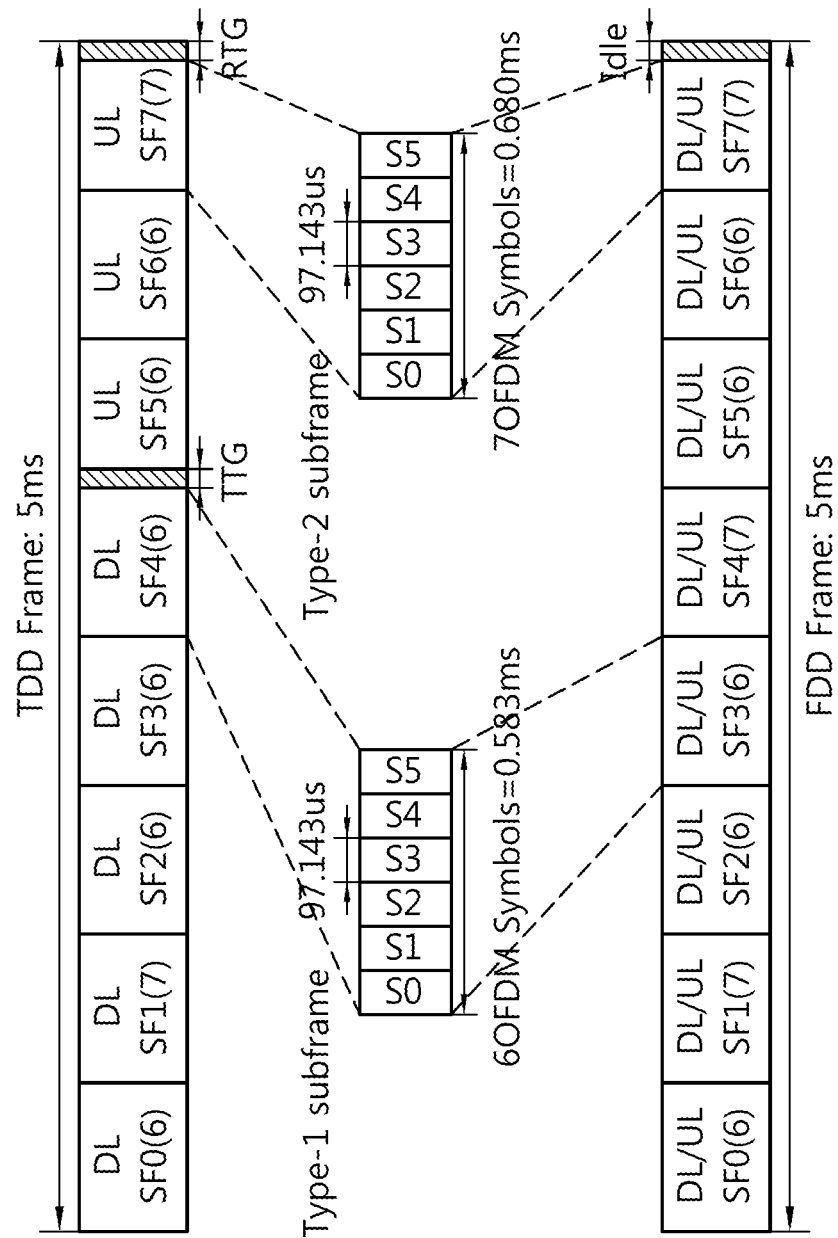
FIG. 5 is a diagram showing an example of a frame structure.

FIG. 5 is a diagram showing an example of a frame structure. This drawing shows a case in which G is 1/16. The frame structure of FIG. 5 can be applied to both an FDD system and a TDD system. The frame includes 8 subframes SF0, SF1, SF2, SF3, SF4, SF5, SF6, and SF7, and the ratio of DL subframes to UL subframes can be 5:3 in TDD system. The frame structure of FIG. 5 can be applied to a case in which the bandwidth is 5 MHz, 10 MHz, or 20 MHz. Each of the subframes may have 6 or 7 OFDM symbols.

Figure 6:
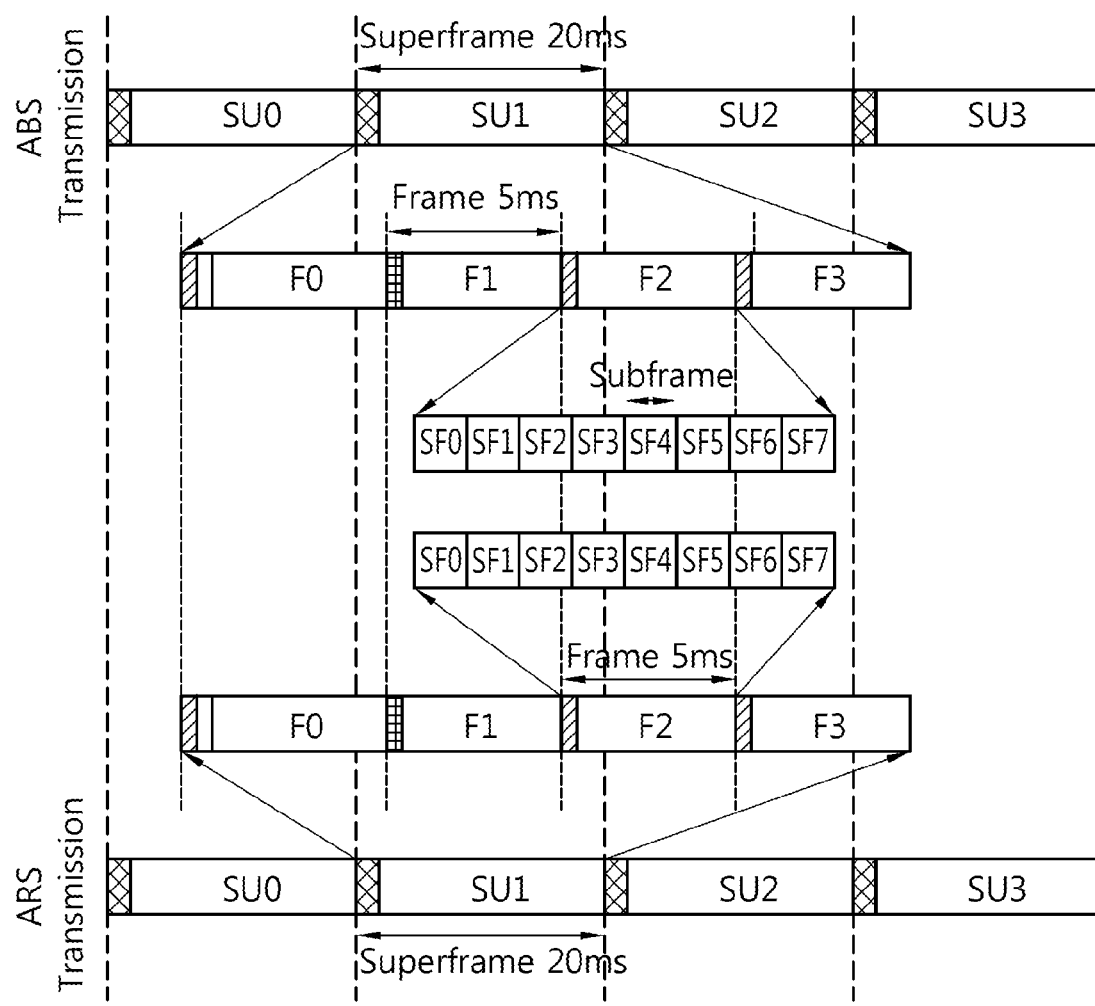
FIG. 6 is a diagram showing an example of a frame structure which can be used in a wireless communication system including relay stations.

FIG. 6 is a diagram showing an example of a frame structure which can be used in a wireless communication system including an RS.

In the wireless communication system including the RS, the RS can use the same OFDMA parameters as a BS (refer to Table 1). Further, as shown in FIG. 6, the superframe structure of a RS can be the same as the superframe structure of an BS.

The superframe of the BS and the superframe of the RS can be time-aligned, and they can have the same number of frames and subframes. Each of all the superframes of the RS can include a superframe header, and the superframe header transmitted by the RS can have the same time location and format as the superframe header transmitted by the BS. Further, a preamble (for example, an SA-preamble and a PA-preamble) transmitted by the RS can be synchronized with a preamble transmitted by the BS and then transmitted.

An RS requires a radio resource region in which a signal can be transmitted to a relay MS(RS-MS) in the downlink because it has to transmit its own DL control information (for example, a preamble or an superframe header (SFH)). Further, an RS requires a radio resource region in which a signal can be transmitted to a BS in the uplink because it has to receive a signal from a relay MS, decode the signal, and retransmit the decoded signal to the BS. Further, an RS transmits a signal to a relay MS or receives a signal from a BS in the same frequency band. Alternatively, an RS receives a signal from a relay MS or transmits a signal to a BS in the same frequency band. Accordingly, the RS requires an operation switching time for operation stabilization when the operation for transmitting and receiving a signal is switched. In general, it is assumed that an RS does not receive or transmit a signal in the operation switching time.

Further, an RS receives a signal, transmitted by a BS or a relay MS, after a propagation delay time. Likewise, a signal transmitted by an RS is received by a BS or a relay MS after a propagation delay time.

That is, a frame applied to an RS must take the operation switching time and the propagation delay time into consideration. A frame structure and a method of transmitting a frame to be described later can be applied to a 2 hop RS (i.e., an RS in a BS-RS-MS structure) or a 3 hop RS (i.e., an RS 1 and an RS 2 in a BS-RS 1-RS 2-MS structure) from among non-transparent RSs and can also be applied to transparent RSs. Further, the frame structure and the method can be applied to not only distributed scheduling, but also centralized scheduling.

First, in order to clarify the description, terminologies are defined.

In the following drawings and descriptions, an ABS refers to a BS (i.e. ABS=BS), an ARS refers to an RS (i.e. ARS=RS), and an AMS refers to an MS (i.e. AMS=MS). ABS, ARS and AMS are terminologies used in IEEE 802.16m standard.

Round Trip Delay (RTD) refers to a round trip delay time between two communication stations. For example, in communication between an RS and a BS (i.e., a superordinate station of the RS), the RTD can be the sum of the time that the BS takes to receive a signal transmitted by the RS and the time that the RS takes to receive a signal transmitted by the BS. From a viewpoint of the RS, the RTD can include a round trip delay time in communication with the BS and a round trip delay time in communication with a relay MS. The RTD is indicated by ARSRTD in the case of an RS, indicated by ABSRTD in the case of a BS, and indicated by AMSRTD in the case of an MS. Accordingly, ½ RTD can refer to a propagation delay time from a station on one side to a station on the other side.

A Transmit/receive Transition Gap (TTG) refers to a minimum value of a time interval which is required between a point of time at which a signal is transmitted and a point of time at which a signal is received in case where the signal is transmitted and the signal is received. An ARSTTG indicates a TTG in an RS frame, and an ABSTTG indicates a TTG in a BS frame (In the following drawings, the ABSTTG can be simply indicated by a TTG). For example, the ARSTTG can be measured as a time interval from the last sample time of a transmission burst to the first sample time of a reception burst in the antenna port of an RS. The ABSTTG can be the time longer than one symbol.

A Receive/transmit Transition Gap (RTG) refers to a minimum value of a time interval which is required between a point of time at which a signal is received and a point of time at which a signal is transmitted in case where the signal is received and the signal is transmitted. An ARSRTG indicates an RTG in an RS frame, and an ABSRTG indicates an RTG in a BS frame (In the following drawings, the ABSRTG can be simply indicated by an RTG). For example, the ARSRTG can be measured as a time interval from the last sample time of a reception burst to the first sample time of a transmission burst in the antenna port of an RS.

An idle time is the time for preventing Inter-Symbol Interference (ISI) and may be include in a TTG or an RTG or can be given as an additional time. In case where a BS frame is an FDD frame, the time interval of an idle state is included between the BS frames. Such an time interval is indicated by IdleTime. In case where an RS frame is an FDD frame, the time interval of an idle state is included between the RS frames. Such an time interval is indicated by R_IdleTime. In the FDD DL frame of an RS, R_IdleTime can be equal to IdleTime. In the FDD UL frame of an RS, R_IdleTime can be equal to or smaller than IdleTime.

The following table shows an example of a bandwidth, the length of a symbol according to the length of a CP, TTG/RTG, and an idle time.

TABLE 2

| | BW | 5/10/20 MHz | 7 MHz | 8.75 MHz |
|---|---|---|---|---|
| ⅛ CP | OFDM symbol time | 102.857 us | 144 us | 115.2 us |
| | TTG/RTG in TDD mode | 105.714/60 us | 180/60 us | 138.4/74.4 us |
| | Idle Time in FDD mode | 62.857 us | 104 us | 46.4 us |
| 1/16 CP | OFDM symbol time | 97.143 us | 136 us | 108.8 us |
| | TTG/RTG in TDD mode | 82.853/60 us | 188/60 us | 87.2/74 us |
| | Idle Time in FDD mode | 45.71 us | 104 us | 104 us |
| ¼ CP | OFDM symbol time | 114.286 us | 160 us | 128 us |
| | TTG/RTG in TDD mode | 139.988/60 us | 140/60 us | TBD |
| | Idle Time in FDD mode | 85.694 us | 40 us | 8 us |

In case where the cell coverage of a BS is 5 Km, RTD can be 33.3 μs, RTD/2 can be 16.7 μs, and ARSTTG or ARSRTG can be 50 μs.

In a wireless communication system including an RS, a BS frame can be divided into an access zone and a relay zone. In the BS frame, the access zone is located before the relay zone. Access zone duration and relay zone duration can differ in the UL and the DL. A BS can inform an RS of the zone configuration of the access zone and the relay zone.

A BS frame can include a DL access zone and a DL transmission zone. The DL access zone refers to a radio resource region in which a BS transmits a signal to a macro MS. The DL transmission zone refers to a radio resource region in which a BS transmits a signal to an RS or a macro MS or both. The BS frame can further include an UL access zone and an UL reception zone. The UL access zone refers to a radio resource region in which a BS receives a signal from a macro MS. The UL reception zone refers to a radio resource region in which a BS receives a signal from a macro MS or an RS or both.

An RS frame can include a DL access zone, a DL reception zone, an UL access zone, and an UL transmission zone. The DL access zone refers to a radio resource region in which an RS transmits a signal to a relay MS. The DL reception zone refers to a radio resource region in which an RS receives a signal from a BS. The UL access zone refers to a radio resource region in which an RS receives a signal from a relay MS. The UL transmission zone refers to a radio resource region in which an RS transmits a signal to a BS.

In the following drawings, the DL reception zone or the DL transmission zone can also be referred to as a DL relay zone. The UL transmission zone or the UL reception zone can also be referred to as an UL relay zone. ABS or an RS can inform an MS of the locations of the DL relay zone and the UL relay zone. An RS can sustain long TTI allocation over the entire access zone or relay zone in the downlink or uplink.

A method of an RS transmitting and receiving a signal is described below on the basis of the above terminologies.

An RS receives frame configuration information about an RS frame from a BS and configures the RS frame on the basis of the frame configuration information. The frame configuration information can include information about a radio resource region in which communication with a relay MS is performed and about a radio resource region in which communication with the BS is performed in the RS frame. The frame configuration information can further include information about the type of a frame and OFDMA parameters. A BS can transmit the frame configuration information with it included in DL control information. For example, the frame configuration information can be broadcasted or multicasted with it included in an SF header. In this case, the frame configuration information can be applied to a plurality of frames. A method of an RS transmitting and receiving a signal using an RS frame configured on the basis of the frame configuration information is described in detail later. An RS transmits or receives a signal to a relay MS or a BS using the configured RS frame structure.

Figure 7:
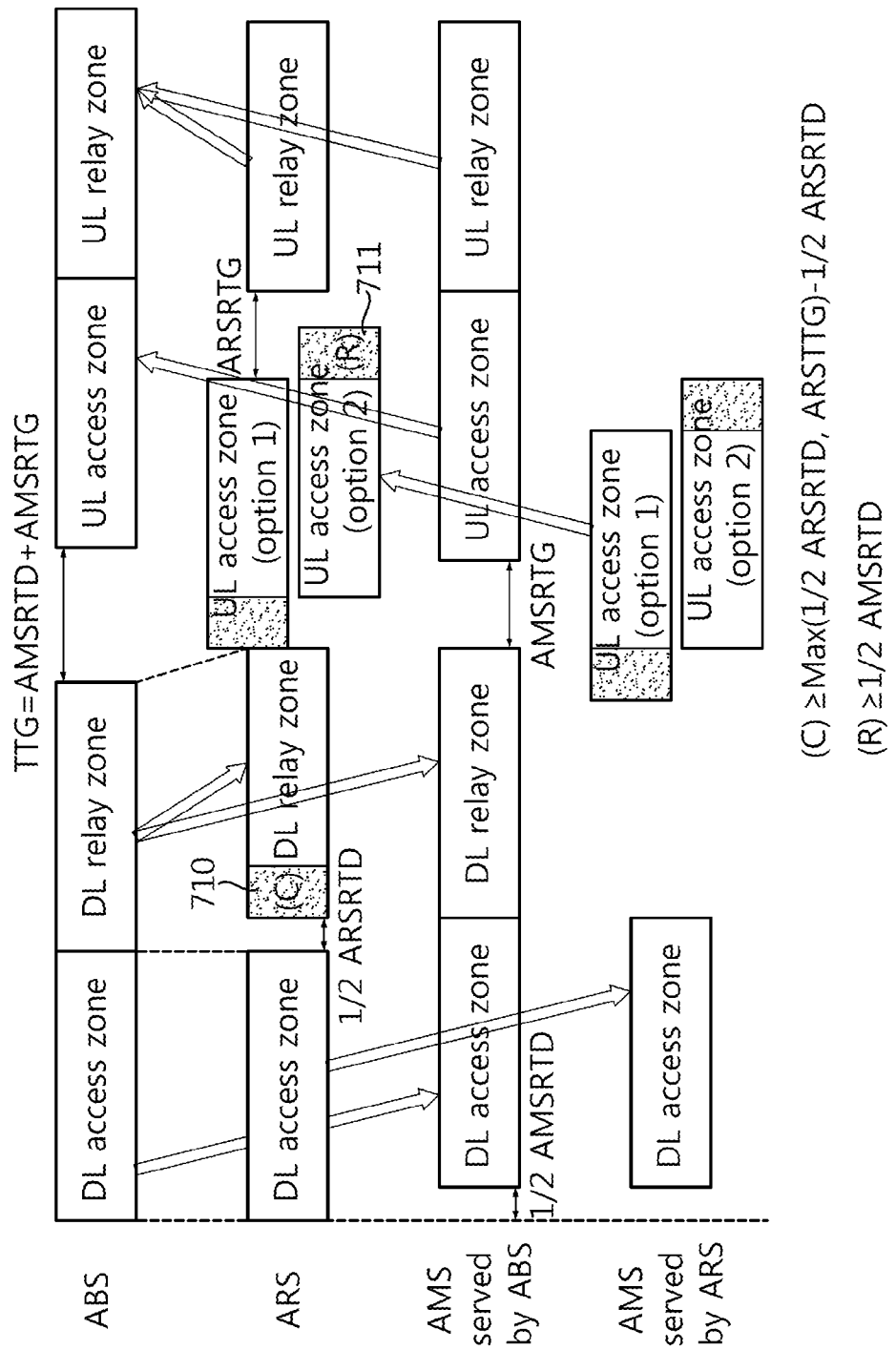
FIG. 7 is a diagram conceptually showing a frame structure to which a method of a relay station transmitting and receiving a signal according to an embodiment of the present invention is applied.

FIG. 7 is a diagram conceptually showing a frame structure to which a method of an RS transmitting and receiving a signal according to an embodiment of the present invention is applied.

It is assumed that a BS and an RS perform time-alignment between a BS frame and an RS frame and transmit a signal. In this case, an RS frame structure is called a time-aligned frame. It is also assumed that ARSRTD is equal to AMSRTD, for convenience sake.

The BS (ABS) transmits a signal to a macro MS (i.e. AMS served by ABS) in the DL access zone, and the RS (ARS) transmits a signal to a relay MS (i.e. AMS served by ARS) in the DL access zone. It is assumed that the propagation delay time that the macro MS takes to receive a signal is equal to the propagation delay time that the relay MS takes to receive a signal, for convenience sake. The macro MS and the relay MS receive the signals after ½ AMSRTD.

After transmitting the signal to the relay MS in the DL access zone of the RS frame, the RS receives a signal from the BS in the DL reception zone (i.e., the DL relay zone of the RS frame). Here, the RS receives the signal, transmitted in the DL relay zone of the BS frame, in the DL relay zone of the RS frame after ½ ARSRTD. The RS experiences the switching of the operation mode from the transmission mode (i.e., the DL access zone) to the reception mode (i.e., the DL relay zone) and requires the time as much as ARSTTG for the operation mode switching.

If the ½ ARSRTD is greater than or equal to the ARSTTG, the RS does not have a problem in receiving the signal transmitted by the BS. However, if the ½ ARSRTD is smaller than the ARSTTG, the RS can have a problem in receiving the signal transmitted by the BS. This is because the signal transmitted by the BS must be sometimes received in the operation mode switching process. In such a case, for example, some or all of the first symbols of a DL relay zone in the RS frame can be configured as a transition time and the signal may not be received. In this case, the transition time can be referred to as a Relay Transmit to receive Transition Interval (R-TTI). The terminology R-TTI is used to indicate that it is required because of an operation of an RS transmitting a signal to a relay MS and then receiving a signal from a BS. The transition time is indicated by (C) 710 in FIG. 7. The region indicated by (C) 710 can be greater than or equal to {Max(½ ARSRTD, ARSTTG)-½ ARSRTD} in the time domain, and it can correspond to the time ranging from 0 to a maximum of one symbol. That is, the R-TTI may be necessary or may not be necessary.

Although not shown in FIG. 7, the transition time may be included in the DL access zone of an RS frame. For example, the last symbol of a DL access zone can be used as the transition time. Here, an RS can transmit a signal to a relay MS using symbols other than the last symbol in the DL access zone.

If the RS transmits the DL access zone ahead as much as Max(½ ARSRTD, ARSTTG) or more than Max Max(½ ARSRTD, ARSTTG) without time-aligning the DL access zone and the DL access zone of a BS, the use of additional symbols for a transition time in the DL access zone and the DL relay zone in an RS frame can be prevented. As described above, an RS frame which has been temporally shifted is called a time-shifted frame. A method of an RS transmitting and receiving a signal using the time-shifted frame and the time-aligned frame is described in detail later.

The RS receives a signal from the relay MS in the UL access zone placed after the DL relay zone of the RS frame. In this case, the RS continues to operate in the reception mode (in the DL relay zone and in the UL access zone) and may not need the operation mode transition time. Accordingly, the UL access zone can be placed in succession to the DL relay zone. This is shown in an option 1 in FIG. 7.

It is assumed that the method of the option 1 is used. That is, in case where an UL access zone is placed in succession to a DL relay zone, a relay MS served by an RS has to transmit a signal before ½ AMSRTD on the basis of the UL access zone of the RS frame. In this case, the DL relay zone of the RS can overlap with the UL access zone of the relay MS, which can serve as interference.

If the RS is sought to transmit a signal to a BS in the UL relay zone after receiving a signal in the UL access zone, it requires the time ARSRTG. If the RS transmits a signal in the UL relay zone of an RS frame, the BS receives the signal after ½ ARSRTD. Accordingly, from a viewpoint of the BS, the time required between the DL frame region and the UL frame region is ½ ARSRTD+ARSRTG+½ ARSRTD=ARSRTD+ARSRTG.

In the RS frame, the UL access zone can be configured so that it is received after ½ AMSRTD or later on the basis of the DL relay zone. This is shown as an option 2 in FIG. 7. In the case of the option 2, the UL access zone can be configured so that the relay MS can transmit a signal after ½ AMSRTD or later as compared with the option 1. If the RS is sought to transmit a signal in the UL relay zone after receiving a signal in the UL access zone, it requires the time ARSRTG. If the time interval between the UL access zone and the UL relay zone of the RS frame is greater than or equal to the ARSRTG, the RS does not have problem in receiving a signal transmitted by the relay MS. However, if the time interval between the UL access zone and the UL relay zone of the RS frame is small than the ARSRTG, the RS can have a problem in receiving a signal transmitted by the relay MS. This is because the RS may be obliged to receive a signal transmitted by the relay MS in the operation mode switching process. In such a case, for example, some or all of the last symbols of the UL access zone of the RS frame can be configured as a transition time, and a signal may not be received. In this case, the transition time can be called a Relay Receive to transmit Transition Interval (R-RTI). The terminology R-RTI is used to indicate that it is required because of an operation of an RS receiving a signal from to a relay MS and then transmitting a signal to a BS. The transition time is indicated by (R) 711 in FIG. 7. A region indicated by the transition time can be greater than or equal to ½ AMSRTD in the time domain, and it can correspond to the time as much as a maximum of one symbol.

If the RS is sought to transmit a signal in the UL relay zone, the BS receives the signal after ½ ARSRTD. Accordingly, from a standpoint of the BS, the time required between the DL frame region and the UL frame region can be ½ ARSRTD+½ AMSRTD+ARSRTG+½ ARSRTD in the case of the option 2.

In the options 1 and 2, if the time required between the DL frame region and the UL frame region from a standpoint of the BS is greater than the TTG of the BS frame, the RS has to use some symbols for a transition time.

Figure 8:
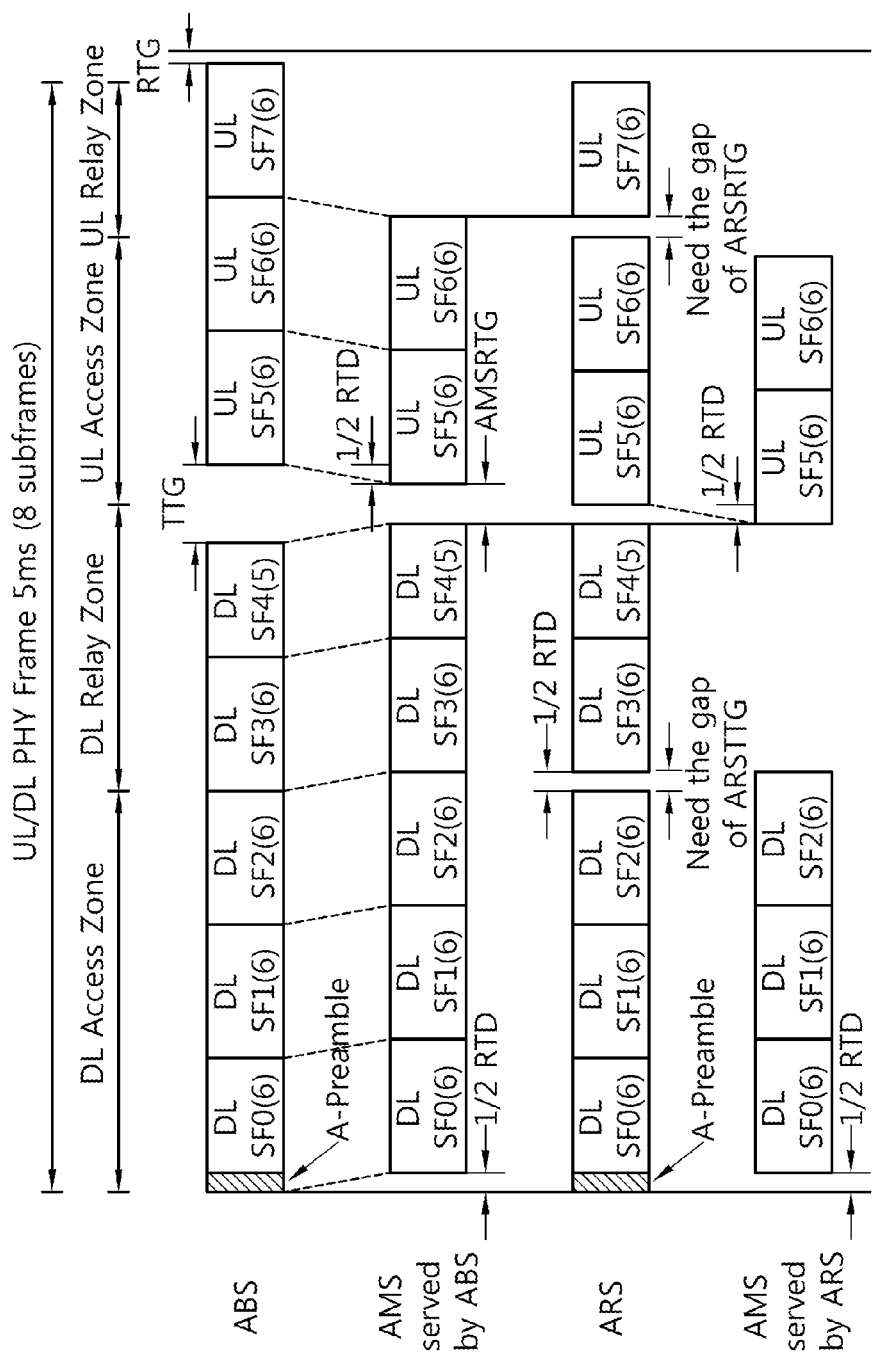
FIG. 8 is a diagram showing a TDD frame structure.

FIG. 8 is a diagram showing a TDD frame structure.

In FIG. 8, it is assumed that all stations have the same propagation delay time of ½ RTD, for convenience sake. In case where an ARSTTG is smaller than or equal to ½ RTD, the DL frame structure of an RS has the same as the DL frame structure of a BS. However, if the ARSTTG is greater than the ½ RTD, two options are possible. According to the first option, in the DL subframe of an RS frame, some symbols can be used as a transition time. The symbols used as the transition time can be used for the time interval of (ARSTTG−½ RTD).

According to the second option, if (RTG+½ RTD) is temporally longer than (ARSTTG−½ RTD), the DL access zone of an RS frame is transmitted before the DL access zone of a BS frame by (ARSTTG−½ RTD). That is, a time shift frame structure is used. Here, the RTG is placed between the UL relay zone of a frame (n−1) of the BS and the DL access zone of a frame n of the BS. If a value of (RTG+½ RTD) is greater than a value of (ARSTTG−½ RTD), synchronization between frames is not influenced although the RS advances the transmission of the DL access zone by the value (ARSTTG−½ RTD). In general, an ARSTTG is longer than ½ RTD. Further, in most frame structures, (RTG+½ RTD) is longer than (ARSTTG−½ RTD).

If (ARSRTG+RTD) is smaller than or equal to a TTG, the UL access zone of an RS can be received after a lapse of ½ RTD since a DL relay zone was received. If the (ARSRTG+ RTD) is greater than the TTG, the UL access zone is received after a lapse of the ½ RTD since the DL relay zone was received, but some symbols of the UL access zone may must be used for a transition time. The time necessary for the transition time can be represented by (TTG−ARSRTG− RTD), and one symbol can be used as the transition time. In general, assuming a serving BS having the cell coverage of 5 km, (ARSRTG+RTD) is smaller than or equal to the TTG. This is true in most cases other than the case of a 1/16 CP in 5, 10, and 20 MHz. Further, in most cases other than the case of a ¼ CP in 8.75 MHz, (½ RTD+Idle Time) is greater than (ARSTTG−½ RTD).

In the above description, the transition time (i.e., the R-TTI or the R-RTI) can be expressed using the following equation. First, the TDD frame of an RS is described below.

In the TDD frame of an RS, the R-TTI (Relay Transmit to receive Transition Interval) can be included in the DL access zone or the DL relay zone in the downlink, and the R-RTI (Relay Receive to transmit Transition Interval) can be included in the UL access zone or the UL relay zone in the uplink. The R-TTI and the R-RTI can be used to control the timing of frames by taking a TTG and RTD between an RS and a superordinate station into consideration. The R-TTI and the R-RTI may be 0 and can have a value corresponding to a maximum of one symbol.

In case where the operation of an RS switches from the transmission mode to the reception mode, the last symbol of a DL access zone of the RS frame or the first symbol of a DL relay zone thereof can be used as an R-TTI. In this case, a symbol time is set on the basis of a BS frame. The R-TTI can be calculated using the following equation (In all the following equations, an RSTTG means an ARSTTG, an RSRTG means an ARSRTG, and R_RTD means ARSRTD).

$$R-TTI = \begin{cases} 0 & \text{if } R\_RTD/2 \geq RSTTG \\ T_s & \text{if } R\_RTD/2 < RSTTG \end{cases} \quad \text{[Equation 1]}$$

In Equation 1 above and the following equations, $T_s$ indicates an OFDMA symbol time.

1. Time-Shifted UL Frame Structure

The UL frame of an RS can be temporally shifted before the UL frame of a BS and then transmitted. Such a frame structure is called a time-shifted UL frame structure. Assuming that the time in which the UL frame of an RS is advanced on the basis of the UL frame of a BS is $T_{adv}$, the time $T_{adv}$ can be given as, for example, TTG−R_IdleTime. The R_IdleTime is an idle time interval between a DL relay zone and an UL access zone in an RS frame. The R_IdleTime can have a value equal to or smaller than the TTG. That is, the time-shifted UL frame structure can be applied to a case in which the R_IdleTime has a value smaller than the TTG.

In the time-shifted UL frame structure, in case where the operation of an RS is switched from the reception mode to the transmission mode, the last symbol of an UL access zone of an RS frame or the first symbol of an UL relay zone thereof can be used as an R-RTI. The R-RTI can be used to match an RSRTG and R_RTD between the RS and a superordinate station. In this case, a symbol time is set on the basis of a BS frame. The R-RTI can be calculated using the following equation.

$$R-RTI = \begin{cases} 0 & : \text{if } TTG-R\_IdleTime-R\_RTD \geq RSRTG \\ [(RSRTG+R\_IdleTime+R\_RTD-TTG)/T_s] & \\ & : \text{if } TTG-R\_IdleTime-R\_RTD < RSRTG \end{cases} \quad \text{[Equation 2]}$$

In the above equation, R_RTD is round trip delay between an RS and a superordinate station (i.e., a BS). R_IdleTime is equal to or greater than M_RTD/2. Here, M_RTD is round trip delay between an MS and a superordinate station (e.g., an RS). If R_IdleTime is equal to a TTG, R-RTI can be equal to the time of one OFDMA symbol.

2. Time-Aligned UL Frame Structure

The UL frame of an RS can be temporally aligned with the UL frame of a BS and then transmitted. Such a frame structure is called a time-aligned UL frame structure.

In the time-aligned UL frame structure, in case where the operation of an RS is switched from the reception mode to the transmission mode, the last symbol of an UL access zone of an RS frame or the first symbol of an UL relay zone thereof can be used as an R-RTI. The R-RTI can be used to match an RSRTG and R_RTD between the RS and a superordinate station.

Figure 9:
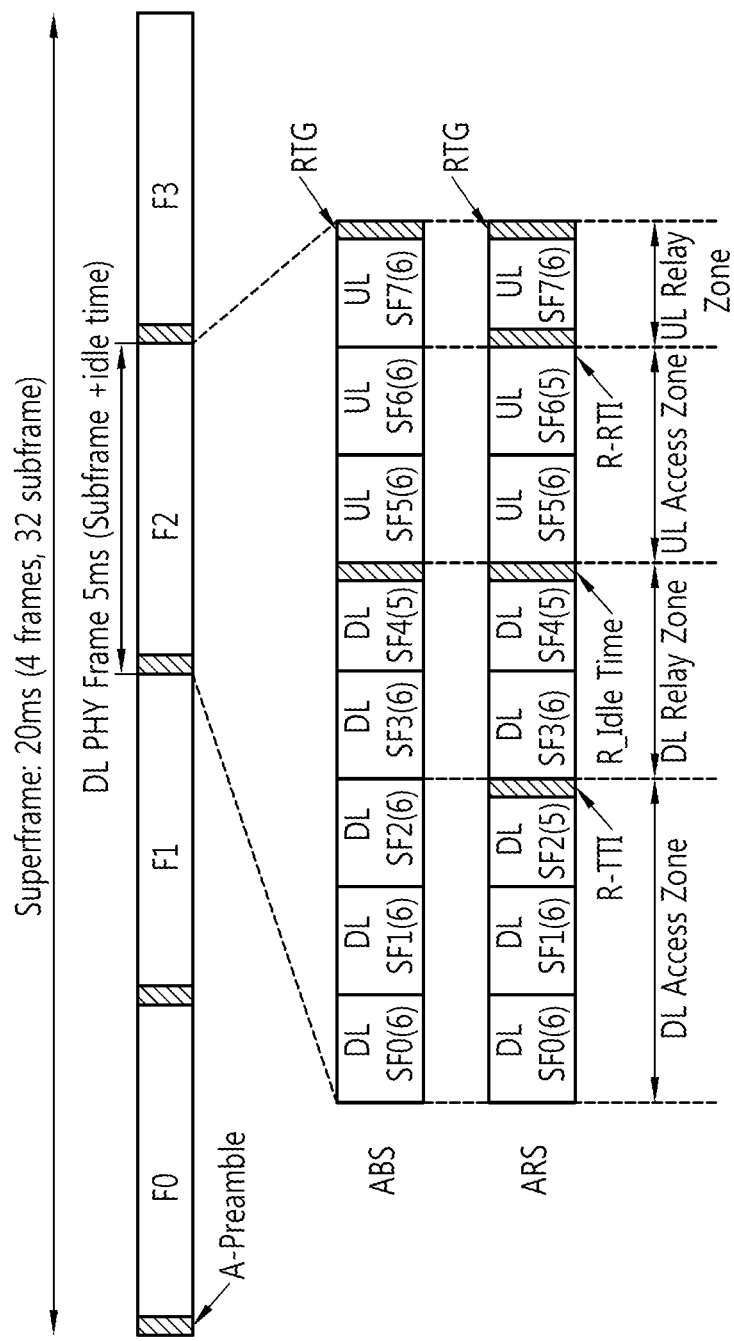
FIG. 9 is a diagram showing an example of a TDD frame structure.

FIG. 9 is a diagram showing an example of a TDD frame structure.

Referring to FIG. 9, the ratio of DL subframes to UL subframes is 5:3. The TDD frame structure can be applied to any one of, for example, channel bandwidths 5, 10, and 20 MHz (G=⅛). The number of subframes allocated to a relay zone is 2 in the downlink, and the number of subframes allocated to a relay zone in the uplink is 1.

In an RS TDD frame, an R-TTI (Relay Transmit to receive Transition Interval) can be included in a DL access zone in the downlink, and an R-RTI (Relay Receive to transmit Transition Interval) can be included in an UL relay zone in the uplink.

Figure 10:
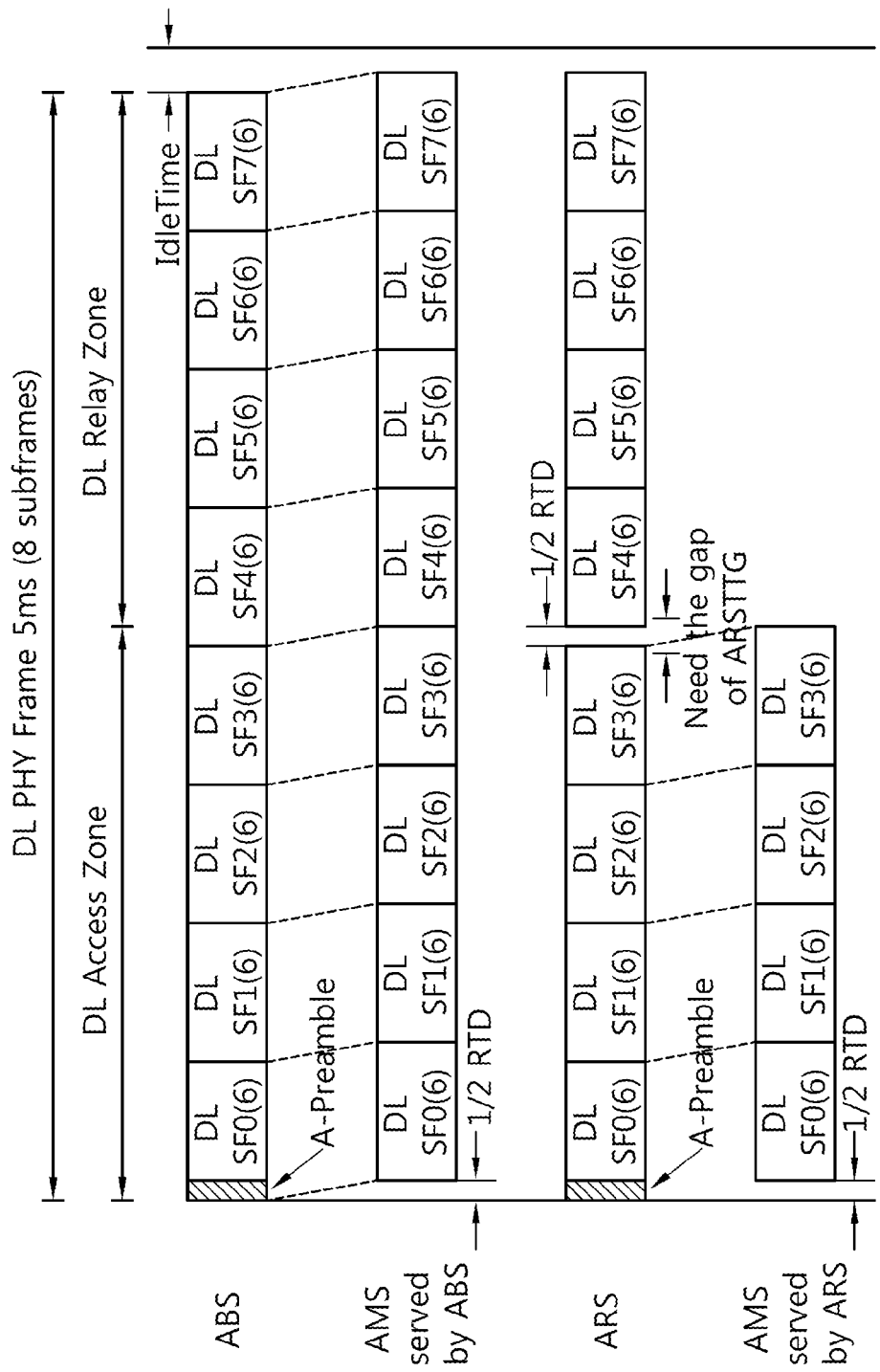
FIG. 10 is a diagram showing an FDD DL frame structure.

FIG. 10 is a diagram showing an FDD DL frame structure.

It is assumed that an RS uses an RS frame time-aligned with a BS frame, as shown in FIG. 10. If an ARSTTG is smaller than or equal to ½ RTD, the DL frame structure of the RS can be used in the same manner as the DL frame structure of a BS.

If the ARSTTG is greater than the ½ RTD, some symbols of the DL subframe of the RS can be used as a transition time. The transition time is the time including (ARSTTG-½ RTD) and can be the time corresponding to a maximum of one symbol.

For example, in case where the RS receives a signal from the BS in the DL subframe 4(DL SF4), the RS is operated in the transmission mode in the DL subframe 3 and then operated in the reception mode in the DL subframe 4. Accordingly, an ARSTTG between the DL subframe 3 and the DL subframe 4 is required. Further, the RS receives a signal, transmitted in the DL subframe 4 of the BS frame, after ½ RTD. Accordingly, if the ARSTTG is greater than the ½ RTD, the time as much as (ARSTTG-½ RTD) is required as a transition time. If the transition time is included in the unit of a symbol, a maximum of one symbol can be used. In other words, the time of the ARSTTG is required between the DL subframe 3 and the DL subframe 4 in the RS frame. Here, if the time of the ARSTTG is smaller than or equal to the ½ RTD, it does not become a problem. However, if the time of the ARSTTG is greater than the ½ RTD, some symbols of the DL subframe 3 or of the DL subframe 4 are resultantly used as the transition time.

If (½ RTD+IdleTime) is longer than the (ARSTTG-½ RTD), the RS can transmit the DL access zone earlier by the (ARSTTG-½ RTD) without time-aligning the DL access zone of the RS and the DL access zone of the BS. However, if the (½ RTD+IdleTime) is shorter than or equal to the (ARSTTG-½ RTD), the RS can use some symbols between the DL relay zone and the DL access zone of a next frame as the transition time.

In general, the ARSTTG is longer than the ½ RTD. Further, in most frame configurations other than the case of 8.75 MHz (¼ CP), (½ RTD+IdleTime) is longer than (ARSTTG-½ RTD).

A transition time (i.e., an R-TTI or an R-RTI) for the above FDD DL frame of the RS can be represented by the following equation.

In case where the operation of an RS is switched from the transmission mode to the reception mode, the last symbol of a DL access zone of an RS frame or the first symbol of an DL relay zone thereof can be used as an R-TTI. The R-TTI can be used to match an ARSTTG and R_RTD between the RS and a superordinate station. In this case, a symbol time is set on the basis of a BS frame. The R-TTI can be calculated using the following equation.

$$R-TTI = \begin{cases} 0 & \text{if } R\_RTD/2 \geq RSTTG \\ T_s & \text{if } R\_RTD/2 < RSTTG \end{cases} \quad \text{[Equation 3]}$$

In case where the operation of the RS is switched from the reception mode to the transmission mode, (the last symbol of a DL relay zone of an RS frame and IdleTime) or (IdleTime and the first symbol of a DL access zone of a next frame) can be used as the R-RTI. In alternative example, IdleTime can be used as the R-RTI. That is, the R-RTI can be calculated using the following equation.

$$R-RTI = \begin{cases} IdleTime & \text{if } IdleTime \geq (RSRTG + R\_RTD/2) \\ T_s + IdleTime & \text{if } IdleTime < (RSRTG + R\_RTD/2) \end{cases} \quad \text{[Equation 4]}$$

Figure 11:
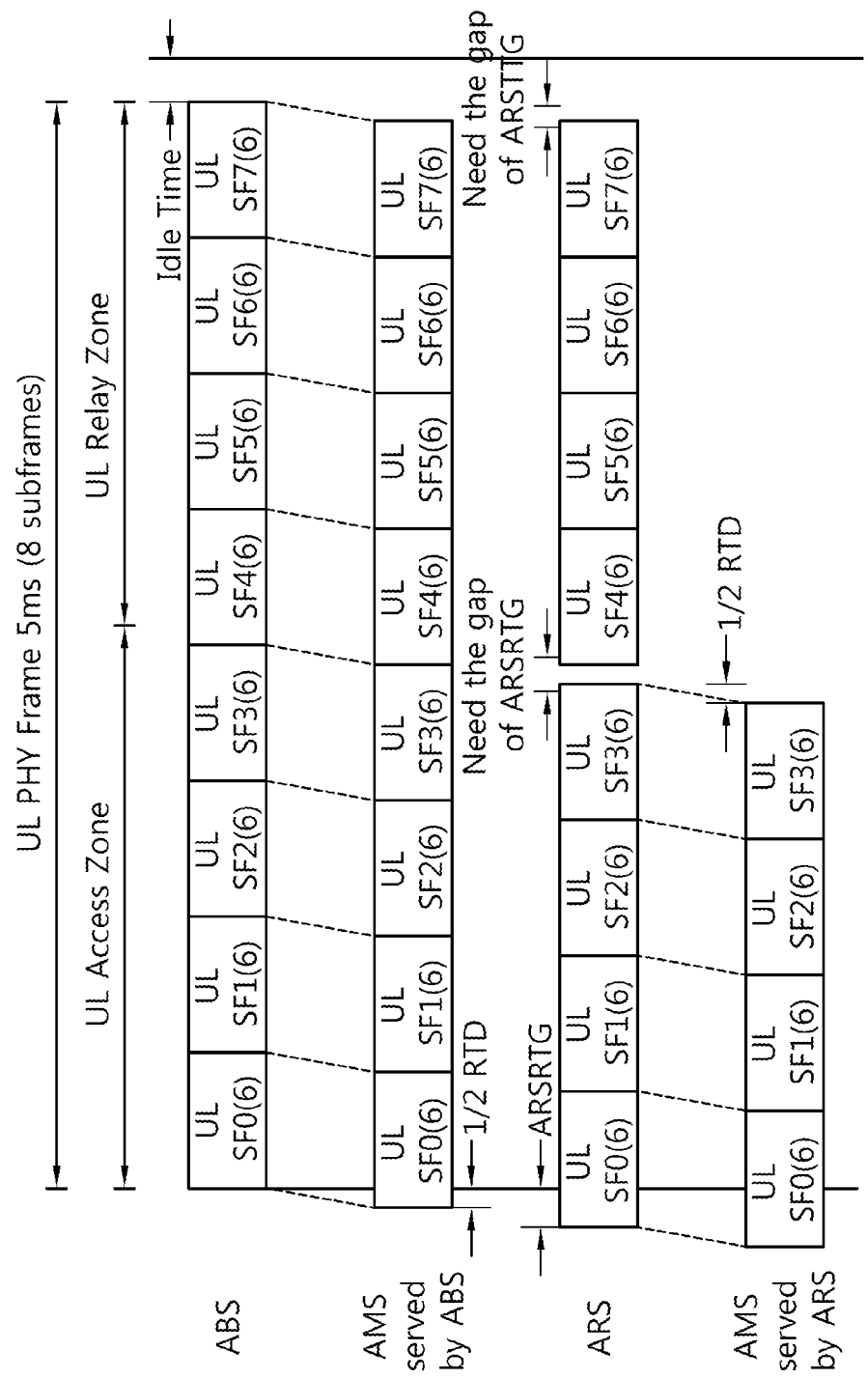
FIG. 11 is a diagram showing an FDD UL frame structure.

FIG. 11 is a diagram showing an FDD UL frame structure.

In case where an RS uses an RS frame not time-aligned with a BS frame as shown in FIG. 11, if IdleTime is greater than or equal to (ARSRTG+ARSTTG), the UL access zone of the RS can be transmitted by the ARSRTG before the UL access zone of a BS.

In case where an RS uses an RS frame not time-aligned with a BS frame as shown in FIG. 11, or IdleTime is smaller than (ARSRTG+ARSTTG) although time-alignment has not been performed, some symbols of an UL subframe of the RS frame can be used as a transition time. For example, one symbol of the UL subframe can be divided and used in two transition times. One of the transition times can be used between the UL access zone and the UL relay zone of the RS frame for the purpose of the ARSRTG, and the other of the transition times can be used between the UL relay zone and the UL access zone of the RS frame for the purpose of the ARSTTG.

A transition time (i.e., an R-TTI or an R-RTI) for the above FDD UL frame of the RS can be expressed using the following equation.

1. Time-Shifted UL Frame Structure

The UL frame of an RS can be a time-shifted UL frame that has been temporally shifted before the UL frame of a BS. Assuming that the time in which the UL frame of the RS is advanced on the basis of the UL frame of the BS is $T_{adv}$, the time $T_{adv}$ corresponds to a case in which the time is not 0. The time $T_{adv}$ can be given as, for example, IdleTime−R_IdleTime.

In the time-shifted UL frame structure, in case where the operation of an RS is switched from the reception mode to the transmission mode or from the transmission mode to the reception mode, (the last symbol of an UL access zone of an RS frame+IdleTime) or (the first symbol of an UL relay zone of the RS frame+IdleTime) can be divided and used in an R-RTI and an R-TTI. The R-TTI or the R-RTI can be in common calculated using the following equation.

$$R-TTI = R-RTI \quad \text{[Equation 5]}$$
$$= \begin{cases} 0 & \text{if } RSTTG + RSRTG \leq IdleTime \\ (T_s + IdleTime)/2 & \text{if } RSTTG + RSRTG > IdleTime \end{cases}$$

2. Time-Aligned UL Frame Structure

The UL frame of an RS can be time-aligned with the UL frame of a BS and then transmitted. Such a frame structure is called a time-aligned UL frame structure. That is, this corresponds to a case where the time $T_{adv}$ is 0.

In the time-aligned UL frame structure, in case where the operation of an RS is switched from the reception mode to the transmission mode, the last symbol of an UL access zone of an RS frame or the first symbol of an UL relay zone thereof can be used as the R-RTI. Further, in case where the operation of the RS is switched from the transmission mode to the reception mode, if an RSTTG is greater than (R_RTD/2+ IdleTime), the last symbol of the UL relay zone can be used as the R-TTI.

Figure 12:
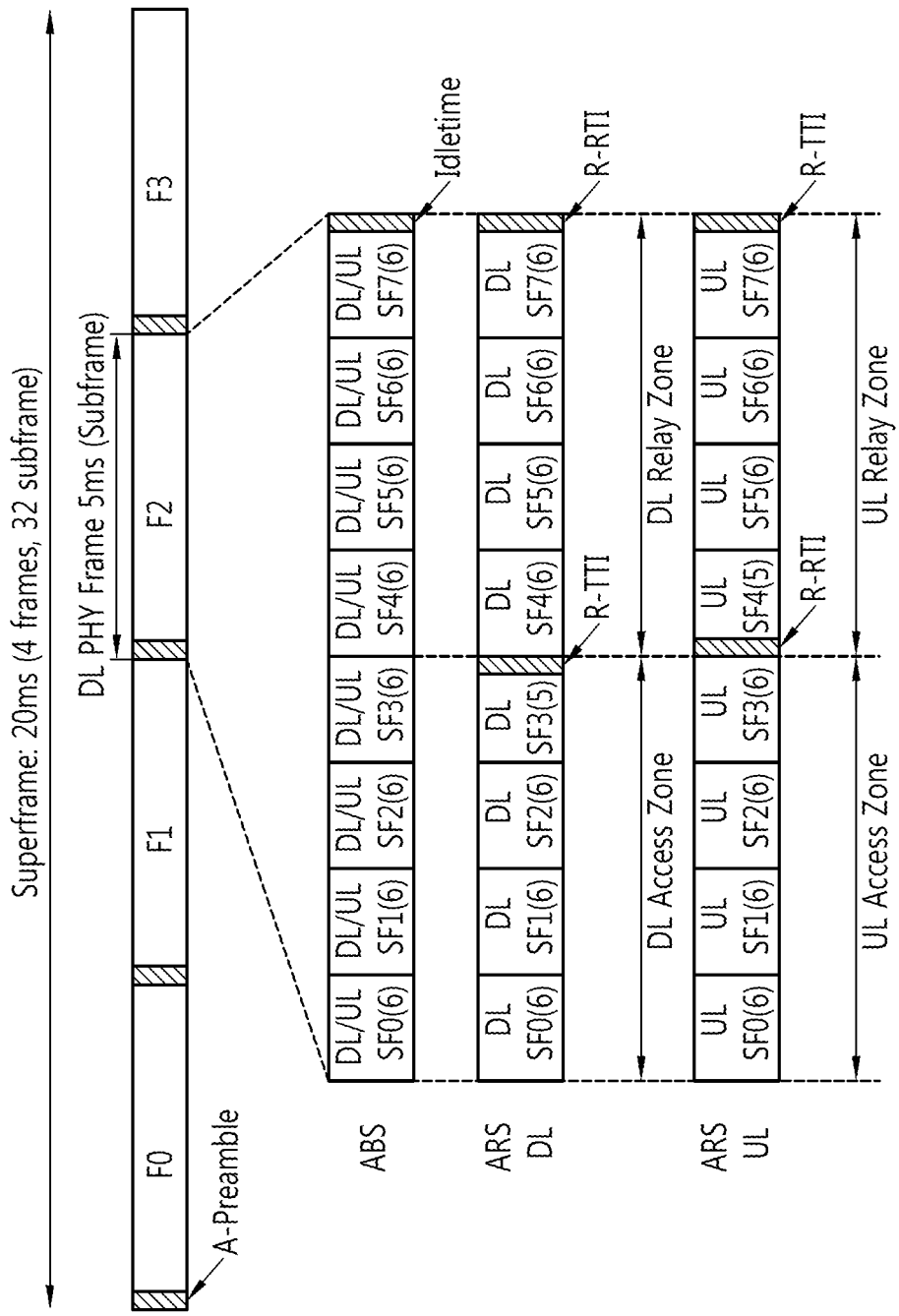
FIG. 12 is a diagram showing an example including a transition time in an FDD frame.

FIG. 12 is a diagram showing an example including a switching time in an FDD frame.

FIG. 12 shows an example in which in an FDD DL frame from among RS frames, an R-TTI is included in the last symbol of a DL access zone and an R-RTI is included in the last symbol of a DL relay zone and/or IdleTime. Further, this drawing shows an example in which in an FDD UL frame from among RS frames, an R-RTI is included in the first symbol of an UL relay zone and an R-TTI is included in the last symbol of an UL relay zone and/or IdleTIme.

As described above, an RS can include the transition time, such as the R-TTI or the R-RTI, in a specific subframe by considering whether an RS frame is a TDD frame or an FDD frame, transmission mode and reception mode switching times such as the RSTTG and the RSRTG, a propagation delay time, IdleTime, and R_IdleTime. Accordingly, according to the present invention, communication can be performed with an RS included in a wireless communication system even without greatly changing a frame structure between the existing BS and the existing macro MS.

Figure 13:
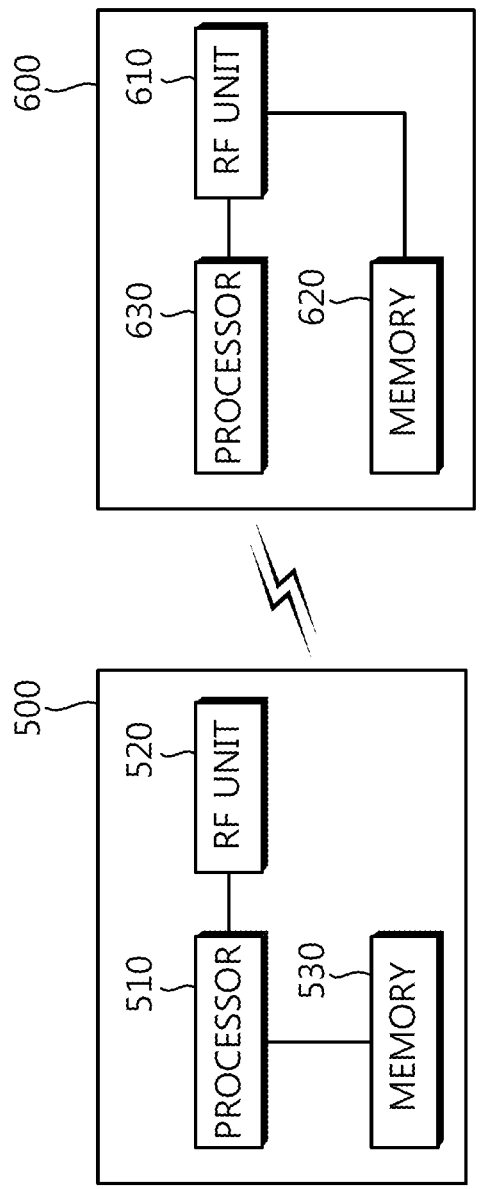
FIG. 13 is a diagram showing the construction of a relay station and a base station.

FIG. 13 is a diagram showing the construction of an RS and a BS.

The BS 500 includes a processor, 510, memory, 530, and an Radio Frequency (RF) unit 520. The processor 510 performs scheduling for allocating radio resources to an RS and receiving a signal from the RS. In the above embodiments, the procedures, schemes, and functions performed by a BS can be implemented by the processor 510. The memory 530 is coupled to the processor 510 and configured to store various pieces of information for driving the processor 510. The RF unit 520 is coupled to the processor 510 and configured to transmit and/or receive a radio signal. A BS can become a source station or a destination station.

The RS 600 includes a processor 610, memory 620, and an RF unit 630. In the above embodiments, the procedures, schemes, and functions performed by an RS can be implemented by the processor 610. The memory 620 is coupled to the processor 610 and configured to store various pieces of information for driving the processor 610. The RF unit 630 is coupled to the processor 610 and configured to transmit and/ or receive a radio signal.

The processor 510, 610 can include an Application-Specific Integrated Circuit (ASIC), other chipset, a logic circuit, and/or a data processor. The memory 530, 620 can include Read-Only Memory (ROM), Random Access Memory (RAM), flash memory, a memory card, a storage medium and/or other storage device. The RF unit 520, 630 can include a baseband circuit for processing a radio signal. When the above embodiments are implemented in software, the above schemes can be implemented using a module (or process or function) for performing the above functions. The module can be stored in the memory 530, 620 and executed by the processor 510, 610. The memory 530, 620 can be placed inside or outside the processor 510, 610 and coupled to the processor 510, 610 using a variety of well-known means.

The present invention can be implemented in hardware or software or using a combination of them. The hardware implementations can be realized using an Application-Specific Integrated Circuit (ASIC), Digital Signal Processing (DSP), a Programmable Logic Device (PLD), a Field Programmable Gate Array (FPGA), a processor, a controller, a microprocessor, other electronic unit, or a combination of them which are designed to perform the above-described functions. The software implementations can be realized using a module for performing the above-described functions. Software can be stored in a memory unit and executed by a processor. Various means well known to those skilled in the art can be used as the memory unit or the processor.

An RS can perform communication with a BS or a relay MS by taking an operation switching time between a reception mode and a transmission mode and a propagation delay time required to transmit and receive a signal into consideration. Accordingly, communication can be performed with an RS included in a wireless communication system even without greatly changing a frame structure between the existing BS and the existing macro MS.

While the present invention has been shown and described in connection with the exemplary embodiments thereof, those skilled in the art will appreciate that the present invention may be changed and modified in various ways without departing from the spirit and scope of the present invention as defined in the following claims.

What is claimed is:

1. A method of a relay station (RS) transmitting and receiving a signal in a wireless communication system including the RS, the method comprising:
   receiving frame configuration information about a RS frame from a base station (BS);
   configuring an uplink (UL) relay zone in which a signal is transmitted to the BS and an UL access zone in which a signal is received from a relay mobile station (MS) connected to the RS in the RS frame on the basis of the frame configuration information;
   transmitting a signal to the BS in the UL relay zone; and
   receiving a signal from the relay MS in the UL access zone,
   wherein the UL access zone is time-aligned with an UL access zone of a BS frame and then transmitted or transmitted before the UL access zone of the BS frame by a specific time interval,
   wherein when the RS switches states from a reception state to a transmission state, a first transition time (R-RTI) is located at the first orthogonal frequency division multiplexing (OFDM) symbol of the UL relay zone wherein the duration of the R-RTI is 0 or 1 OFDM symbol time, and
   when the RS switches states from the transmission state to the reception state, a second transition time (R-TTI) is located at the last OFDM symbol of the UL relay zone wherein the duration of the R-TTI is 0 or 1 OFDM symbol time.

2. The method of claim 1, wherein the RS frame is a Frequency Division Duplex (FDD) uplink frame.

3. A method of a relay station (RS) transmitting and receiving a signal in a wireless communication system including the RS, the method comprising:
   receiving frame configuration information about a RS frame from a base station (BS);
   configuring the RS frame, comprising a downlink (DL) access zone in which a signal is transmitted to a relay mobile station (MS) connected to the RS, a DL relay zone in which a signal is received from the BS, an uplink (UL) access zone in which a signal is received from the relay MS connected to the RS, and an UL relay zone in which a signal is transmitted to the BS, on the basis of the frame configuration information;

transmitting a signal to the relay MS in the DL access zone;

receiving a signal from the BS in the DL relay zone;

receiving a signal from the relay MS in the UL access zone; and transmitting a signal to the BS in the UL relay zone, wherein a first transition time (R-TTI) is located at the last orthogonal frequency division multiplexing (OFDM) symbol of the DL access zone wherein the duration of the R-TTI is calculated by an equation below, $$R-TTI = \begin{cases} 0 & \text{if } R\_RTD/2 \geq RSTTG \\ T_s & \text{if } R\_RTD/2 < RSTTG, \end{cases}$$

in the above equation, RSTTG is a time necessary for the RS to switch from a transmission state to a reception state, R_RTD is a round trip delay time between the RS and the BS, $T_s$ is one OFDM symbol time, and a second transition time (R-RTI) is located at the first OFDM symbol of the UL relay zone, wherein the duration of the R-RTI is 0 or 1 OFDM symbol time.

4. The method of claim 3, wherein the RS frame is a Time Division Duplex (TDD) frame.

5. A relay station (RS), comprising:

a radio frequency (RF) unit configured to transmit and receive a radio signal; and a processor connected to the RF unit, wherein the processor is configured for:

receiving frame configuration information about an RS frame from a base station (BS);

configuring an uplink (UL) relay zone in which a signal is transmitted to the BS and an UL access zone in which a signal is received from a relay mobile station (MS) connected to the RS in the RS frame on the basis of the frame configuration information;

transmitting a signal to the BS in the UL relay zone; and receiving a signal from the relay MS in the UL access zone, wherein the UL access zone is time-aligned with an UL access zone of a BS frame and then transmitted or transmitted before the UL access zone of the BS frame by a specific time interval, wherein when the RS switches states from a reception state to a transmission state, a first transition time (R-RTI) is located at the first orthogonal frequency division multiplexing (OFDM) symbol of the UL relay zone wherein the duration of the R-RTI is 0 or 1 OFDM symbol time, and when the RS switches states from the transmission state to the reception state, a second transition time (R-TTI) is located at the last OFDM symbol of the UL relay zone wherein the duration of the R-TTI is 0 or 1 OFDM symbol time.

6. A relay station (RS), comprising:

a radio frequency (RF) unit configured to transmit and receive a radio signal; and a processor connected to the RF unit, wherein the processor is configured for:

receiving frame configuration information about a RS frame from a base station (BS);

configuring the RS frame, comprising a downlink (DL) access zone in which a signal is transmitted to a relay mobile station (MS) connected to the RS, a DL relay zone in which a signal is received from the BS, an uplink (UL) access zone in which a signal is received from the relay MS connected to the RS, and an UL relay zone in which a signal is transmitted to the BS, on the basis of the frame configuration information;

transmitting a signal to the relay MS in the DL access zone;

receiving a signal from the BS in the DL relay zone;

receiving a signal from the relay MS in the UL access zone; and transmitting a signal to the BS in the UL relay zone, wherein a first transition time (R-TTI) is located at the last orthogonal frequency division multiplexing (OFDM) symbol of the DL access zone wherein the duration of the R-TTI is calculated by an equation below, $$R-TTI = \begin{cases} 0 & \text{if } R\_RTD/2 \geq RSTTG \\ T_s & \text{if } R\_RTD/2 < RSTTG, \end{cases}$$

in the above equation, RSTTG is a time necessary for the RS to switch from a transmission state to a reception state, R_RTD is a round trip delay time between the RS and the BS, $T_s$ is one OFDM symbol time, and a second transition time (R-RTI) is located at the first OFDM symbol of the UL relay zone, wherein the duration of the R-RTI is 0 or 1 OFDM symbol time.

* * * * *